UNITED STATES PATENT OFFICE.

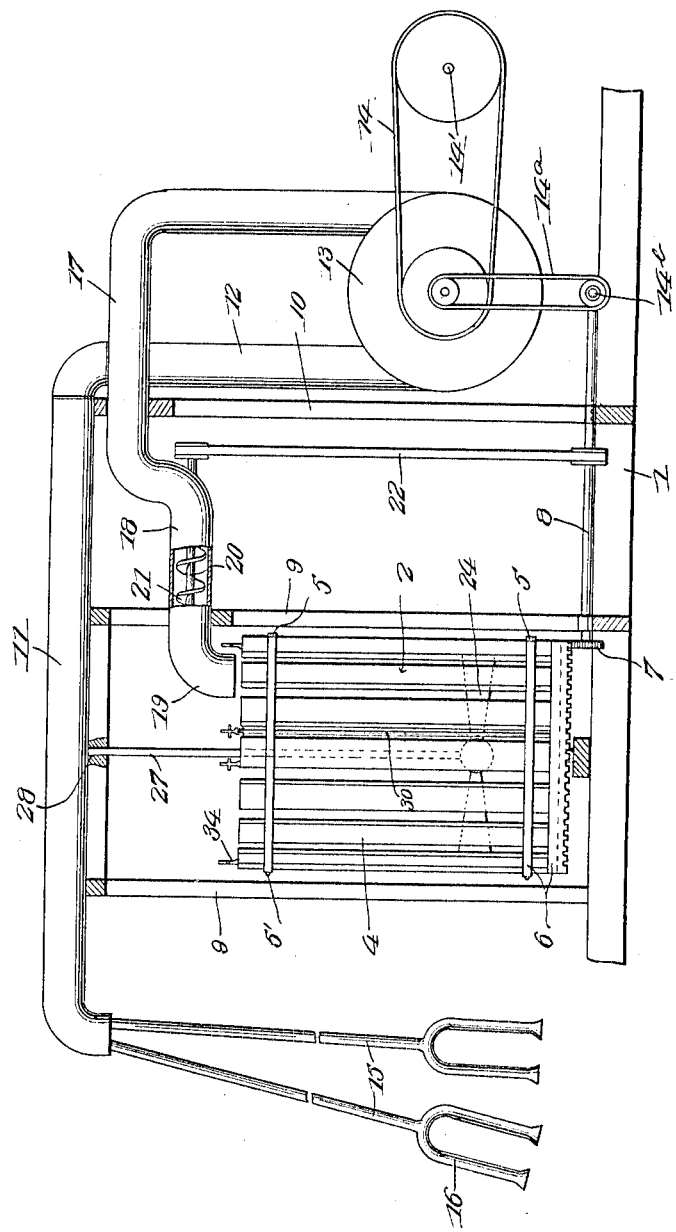

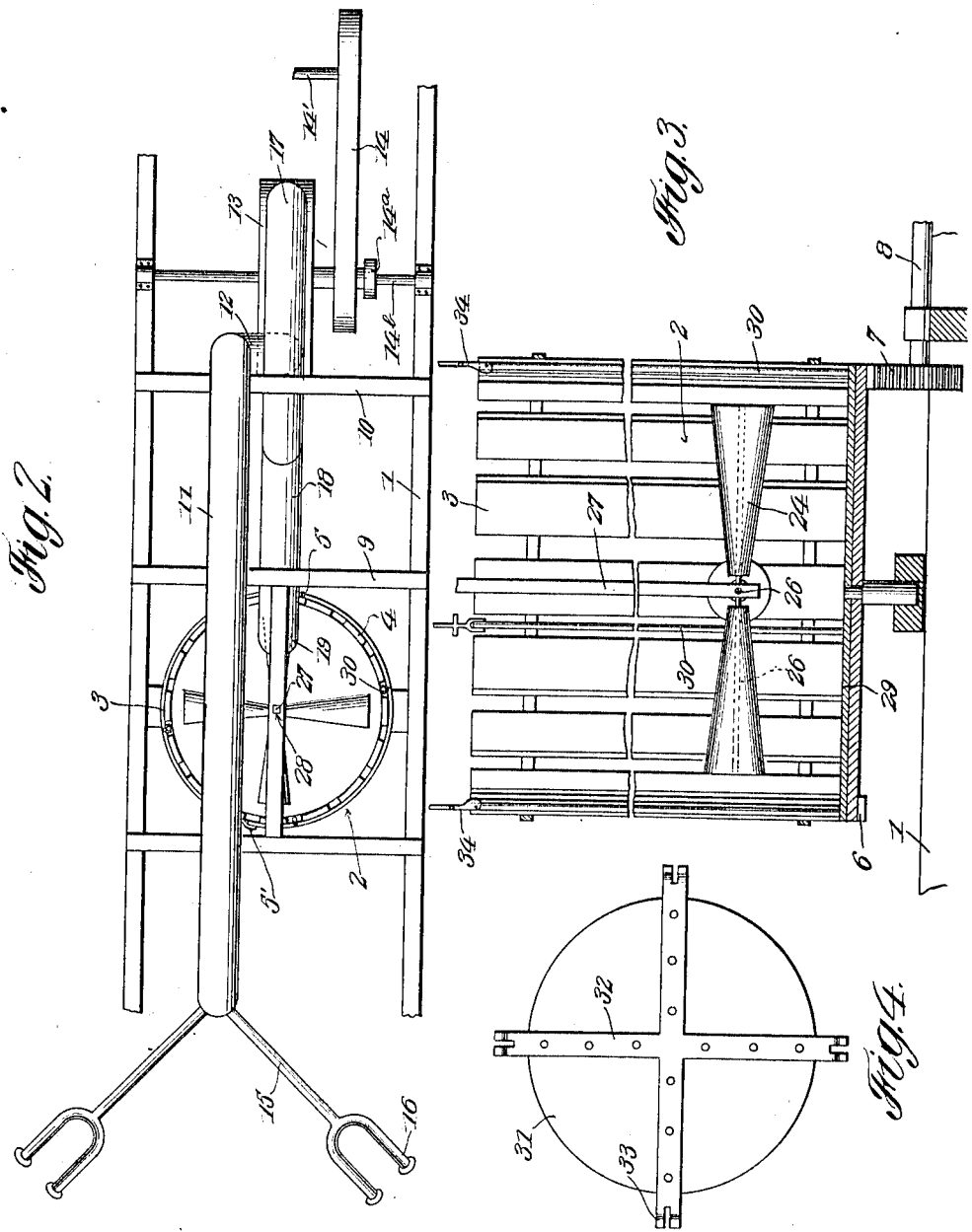

WILLIAM COOK, OF BINGER, OKLAHOMA.

COTTON-BALER.

1,090,281. Specification of Letters Patent. Patented Mar. 17, 1914.

Application filed March 26, 1912, Serial No. 686,326. Renewed August 29, 1913. Serial No. 787,362.

*To all whom it may concern:*

Be it known that I, WILLIAM COOK, a citizen of the United States, residing at Binger, in the county of Caddo and State of Oklahoma, have invented new and useful Improvements in Cotton-Balers, of which the following is a specification.

This invention relates to an apparatus for baling or crating picked cotton, the object of the invention being to provide a baling apparatus embodying a rotary cylinder into which the cotton is delivered and by which it is conveniently distributed, and a compression device operating within said cylinder to pack the cotton to a desired density for formation of a bale.

The invention consists of the features of construction, combination and arrangement of parts, hereinafter fully described and claimed, reference being had to the accompanying drawings, in which:—

Figure 1 is a sectional side elevation of a cotton picking and baling or crating apparatus embodying my invention. Fig. 2 is a top plan view of the same. Fig. 3 is a central vertical section through the cylinder. Fig. 4 is a top plan view of the removable head.

Referring to the drawings, 1 designates the body or bed of a wagon or other vehicle supporting the apparatus, which vehicle may be of a style to be pushed or pulled by draft animals or propelled by power, as desired.

Upon the bed 1 is a baling or crating cylinder 2, composed of two counterpart sections 3 and 4 hinged, as at 5, so as to be opened and closed and adapted to be held in closed position by one or more suitable latches 5'. Said cylinder is adapted to receive the cotton to be baled or crated and is provided at its base with a gear rim 6 meshing with a gear wheel 7 on a shaft 8, whereby said cylinder is adapted to be rotated.

The cylinder is surrounded by a frame 9, and in spaced relation thereto is arranged a second frame 10, which frames support a horizontal suction pipe 11 provided with a depending delivery end 12 communicating with the inlet or the casing of a suction and force pump or fan 13, which is driven by a belt 14 from a primary drive shaft 14' operated by a suitable motor. (Not shown.) A belt 14ª connects the fan shaft with a transverse transmission shaft 14ᵇ, which is in gear with the shaft 8, whereby said shaft is driven.

The inlet end of the suction pipe 11 supports a series of any desired number of picking devices comprising universally jointed or flexible conductors 15, formed of piping or rubber hose and provided with branching nozzles 16, of which any number may be connected with each hose or pipe. These picking devices may be of any suitable length and are flexibly supported to permit them to be manipulated in the field by operators standing on the ground, to adapt the free or suction ends of the nozzles 16 to be placed over or brought into juxtaposition to the cotton bolls for the extraction of the cotton. In practice, the vehicle may be driven ahead of the workmen in the field any suitable distance and limited by the length of the pickers, so that the field may be picked in rear of and about the vehicle, and the latter can be driven forward for a repetition of the above described operation until the entire field is picked.

The outlet end of the fan casing is provided with an exhaust pipe 17 for the discharge of the picked cotton. This exhaust pipe communicates at its outer end with one end of a cotton supply or delivery pipe 18, the opposite end of which is provided with a pendent nozzle 19 to discharge the extracted cotton into the rotary baler or crater 2. Extending longitudinally within the pipe 18 is a shaft 20, carrying an auger-like series of blades or projections 21, which operate to feed the cotton through said pipe and at the same time to loosen up the cotton and free the same from foreign materials. A belt 22 connects the shaft 20 with the shaft 8, whereby the auger shaft is driven.

Arranged within the rotary cylinder 2 is a packing or compressing device comprising series of radial cone rollers 24 mounted to revolve freely on horizontal axes 26, which rollers operate to compress the cotton delivered into the cylinder so as to form a bale, which may be removed, by opening the cylinder, for storage or transportation. The axes 26 are carried by a rod or bar 27, which is of angular form in cross section, and which is mounted to slide freely through an opening 28 in a top bar of the frame 9 which overhangs the cylinder.

A crate is adapted to be arranged within the baling cylinder and comprises a bottom crate 29, a series of upstanding rods 30 and a top or cover plate 31, which latter is provided with right angular reinforcing plates 32 terminating in projecting notched ends 33. The upper ends of the rods 31 carry clamping members 34 to engage the notched ends 33 and bind thereon to hold said cover plate 31 in position.

In operation, a crate of the character described is placed within the cylinder 2, which is opened for its insertion, said crate being left open at top and the arrangement of the rods 30 being such that they lie out of the path of movement of the conical compressing rollers. After the cylinder is closed, the mechanism is set into action and the cotton discharging through the nozzle 19 into the cylinder is evenly distributed therein by the rotation of the cylinder and packed or compressed by the weight of the cone rollers. The rollers revolve freely on their axes by contact with the body of cotton which turns with the cylinder, and as the depth of the cotton increases the rollers move upward with their supporting bar 27, which slides through the opening 28 and is held from rotation by its angular form and the corresponding form of the opening. When the compressed cotton is filled to the top of the crate, the compressing device is adjusted upward to a point above the cylinder, the head 31 applied and secured in position by the latches 34 to hold the cotton compressed into a bale which is confined within the crate, and the cylinder then opened for the removal of the crate. Another crate is then inserted and the operation above described repeated for the formation of another crated bale.

From the foregoing description, taken in connection with the drawings, the construction and mode of operation of my improved portable cotton picking and baling or crating apparatus will be readily understood, and it will be seen that it provides an apparatus of this character which is simple of construction, reliable and efficient in operation and adapted to be conveniently transported across the field to permit of the manipulation of the nozzles for the rapid gathering of the cotton and its compression into compact form for storage or transportation.

Having thus described the invention, what I claim as new is:—

In a cotton baling apparatus, the combination of a framework, a rotary platform supported thereby, an annular series of rods projecting upwardly from the platform, a cylinder composed of vertical slats and horizontal bands surrounding the rods, said cylinder consisting of two hinged and vertically divided sections, means for holding said cylinder closed, a packer supported by the frame for coöperation with the rotary cylinder, a cover for closing said cylinder having notched projections, and clamping members on said rods to engage said notched projections.

In testimony whereof I affix my signature in presence of witnesses.

WILLIAM COOK.

Witnesses:
  W. GRANGER,
  CHAS. RINGO,
  GEORGE M. BAILEY.

---

Copies of this patent may be obtained for five cents each, by addressing the "Commissioner of Patents, Washington, D. C."